United States Patent [19]

Strobel et al.

[11] Patent Number: 5,164,765

[45] Date of Patent: Nov. 17, 1992

[54] EXPOSURE CONTROL PROCESS AND PHOTOGRAPHIC COPYING APPARATUS

[75] Inventors: Christa Strobel, Zollikerberg; Rolf Brönnimann, Buchs, both of Switzerland

[73] Assignee: Gretag Systems, Inc., Bothell, Wash.

[21] Appl. No.: 745,890

[22] Filed: Aug. 16, 1991

[30] Foreign Application Priority Data

Aug. 17, 1990 [CH] Switzerland ............... 2673/90

[51] Int. Cl.⁵ .................. G03B 27/80; G03B 27/72
[52] U.S. Cl. .................. 355/38; 355/68; 355/71; 355/77
[58] Field of Search .......... 355/38, 35, 77, 68, 355/71; 358/75, 80; 356/404, 444

[56] References Cited

U.S. PATENT DOCUMENTS

| | | | |
|---|---|---|---|
| 3,536,402 | 10/1970 | Ashton | 355/35 |
| 3,594,081 | 7/1971 | Tschink | 355/71 X |
| 3,677,633 | 7/1972 | Huber | 355/271 |
| 4,239,385 | 12/1980 | Hujer | 355/71 |
| 4,801,969 | 1/1989 | Hamidian | 355/71 X |
| 4,933,754 | 6/1990 | Reed et al. | 355/40 X |
| 5,036,351 | 7/1991 | Frick et al. | 355/38 |

*Primary Examiner*—Michael L. Gellner
*Assistant Examiner*—D. Rutledge
*Attorney, Agent, or Firm*—Burns, Doane, Swecker & Mathis

[57] ABSTRACT

The copying light of a source of copying light is attenuated in areas using a mask with different density ranges to influence the density by areas of a copy to be produced from a copy master. The appropriate area of the mask is selected by analyzing a location dependent density variation of the mask stored in matrix form in a computing and evaluating unit by predetermined criteria. A photographic copying apparatus associated with the process includes an exposure station with a mask mounted on a slide. The slide may be displaced in response to control signals determined and generated in the computing and evaluating unit. The slide is displaced in a plane parallel to a transport plane of the copy master in the beam path of a source of copying light.

25 Claims, 2 Drawing Sheets

EXPOSURE CONTROL PROCESS AND PHOTOGRAPHIC COPYING APPARATUS

BACKGROUND OF INVENTION

The invention relates to an exposure control process for regulating the density in zones of photographic copies of a copy master scanned by areas. Further, the invention relates to a photographic copying apparatus for the production of photographic copies of copy masters with a measuring station.

The production of high quality copies (e.g., positive images) of copy masters (e.g., negatives or slides) imposes high requirements with regard to the occupational skills of the operating personnel in the case of manual exposures and with regard to the measuring and evaluating devices and the exposure control process in automatic photographic equipment. In known exposure control devices of photographic copying equipment, the copy masters are scanned and measured in sections. From the measured values density and color correction values are determined, together with necessary quantities of copying light. In an exposing station, the photographic copies are then prepared by exposing the copy material to the quantities of copying light determined. In this manner the copy master is exposed overall and at every location to a copying light of the same intensity.

This integral exposure process prohibits individual variation of the copies to be produced, either to obtain special effects or more importantly to correct inadequate exposed copy masters or masters with an excessive contrast range. In the preparation of photographic copies, copy masters with overexposed or underexposed zones are frequently encountered. With this known integral exposure process, photographic copies with overexposed or underexposed areas are often obtained from such masters, in which details relevant to the image disappear. Any correction of the quantity of copy light always affects the entire copy. For example, a reduction of the quantity of copy light brightens otherwise dark copies so that details become visible. However, correctly exposed areas are reproduced with excessive brightness, which again leads to a loss of information in these areas, that is in most cases important for the image. Conversely, increasing the quantity of the copy light to render details visible in zones that are otherwise too bright results in darkening of correctly exposed areas.

It is known from EP-A-315 589 that in manual exposure processes, density masks are held in front of a copy master in the beam path of the copy light in order to compensate for over- or underexposed areas in the photographic copy. In these processes, when amateur or professional photographers improvise density masks from film rests or other materials, correct arrangement of the density masks in the beam path of the copy light is very time consuming and hardly reproducible. Furthermore, this form of locally modifying the density may be examined for correctness only after the preparation of the photographic copy, so that copies which overall appear to be correct are frequently obtained only after several experiments. For this reason, it is proposed in EP-A-315 589 and also in DE-A-2 820 965, to carry out density corrections by areas using an optoelectric mask, which is located in front of the copy master in the beam path of the copy light. In particular, these two documents describe masks of liquid crystal elements arranged as a matrix, the transparency of which may be varied individually by electric control signals. To control and monitor the local density modified in this manner, a beam splitter element is placed between the copy master and the copy material, whereby part of the light coming from the mask and the copy master is diverted and conducted to a video camera together with an image processing unit. The processed image inverted to the positive may then be observed and corrected, if necessary.

While liquid crystal masks permit local density modifications to be carried out in a convenient manner, such masks do have disadvantages. Liquid crystals have a relatively low long term stability. They are also relatively sensitive to temperature. If it is realized that in the continuous operation of a photographic copy apparatus temperatures of considerable magnitude appear in the exposure station, it is readily seen that an additional effort must be made to cool the liquid crystal mask in order to prevent a premature overall or partial degradation of the liquid crystal mask. A particularly important disadvantage of liquid crystal masks is their lack of color fastness. This is intended to signify that particularly in the transition from areas of high transmission to areas of lower transmission of the mask, color tints may appear which naturally would have an extremely negative affect on the color impression of the copies to be produced. Another disadvantage of liquid crystal masks is that the matrix like layout of the liquid crystal elements cannot be changed. Consequently, the arrangement of the matrix elements of the liquid crystal mask and the arrangement of the scanning points of the copy master frequently do not coincide. Furthermore, the entire concept of the local modification of the density of the copies to be produced with the aid of liquid crystal masks requires considerable electrical and electronic elements. The system, aside from the additional cooling devices required, is very expensive and is difficult to incorporate into existing devices. The results of the local modification of density may be observed only by additional, very expensive devices (imaging apparatus, image processor, beam splitter) on a screen. Furthermore, the beam splitting element required in the beam path of the copy light may represent an additional source of error in the exposure.

SUMMARY OF INVENTION

It is therefore an object of the present invention to provide an exposure control process for the regional modification of the density of photographic copies together with a photographic copy apparatus, whereby the aforementioned disadvantages are eliminated.

This and further objects are attained by an exposure control process and a photographic copy apparatus. In a preferred embodiment the apparatus includes a source of measuring light; a detector device for detecting said measuring light; a computing and evaluating unit for analyzing said detected measuring light; and an exposure station, said exposure station further comprising: a projection layout with a source of copying light, servo-controlled color filters, a shutter, projection optics and an attenuating device for attenuating the intensity of the copying light by areas, said attenuating device having a transparent mask with areas of different light permeabilities, said mask being mounted on a sliding device which is displaced in response to control signals generated in the computing and evaluating unit and transmitted to an x-y control unit of the slide, said sliding device being displaced in a plane parallel to the transport plane of the copy master, in a beam path of the copying light source.

BRIEF DESCRIPTION OF THE DRAWINGS

Other objects and advantages will become apparent from the following detailed description of preferred embodiments of the invention as described in conjunction with the accompanying drawings wherein like reference numerals are applied to like elements and wherein.

DETAILED DESCRIPTION OF THE PREFERRED EMBODIMENT

Figure 1:
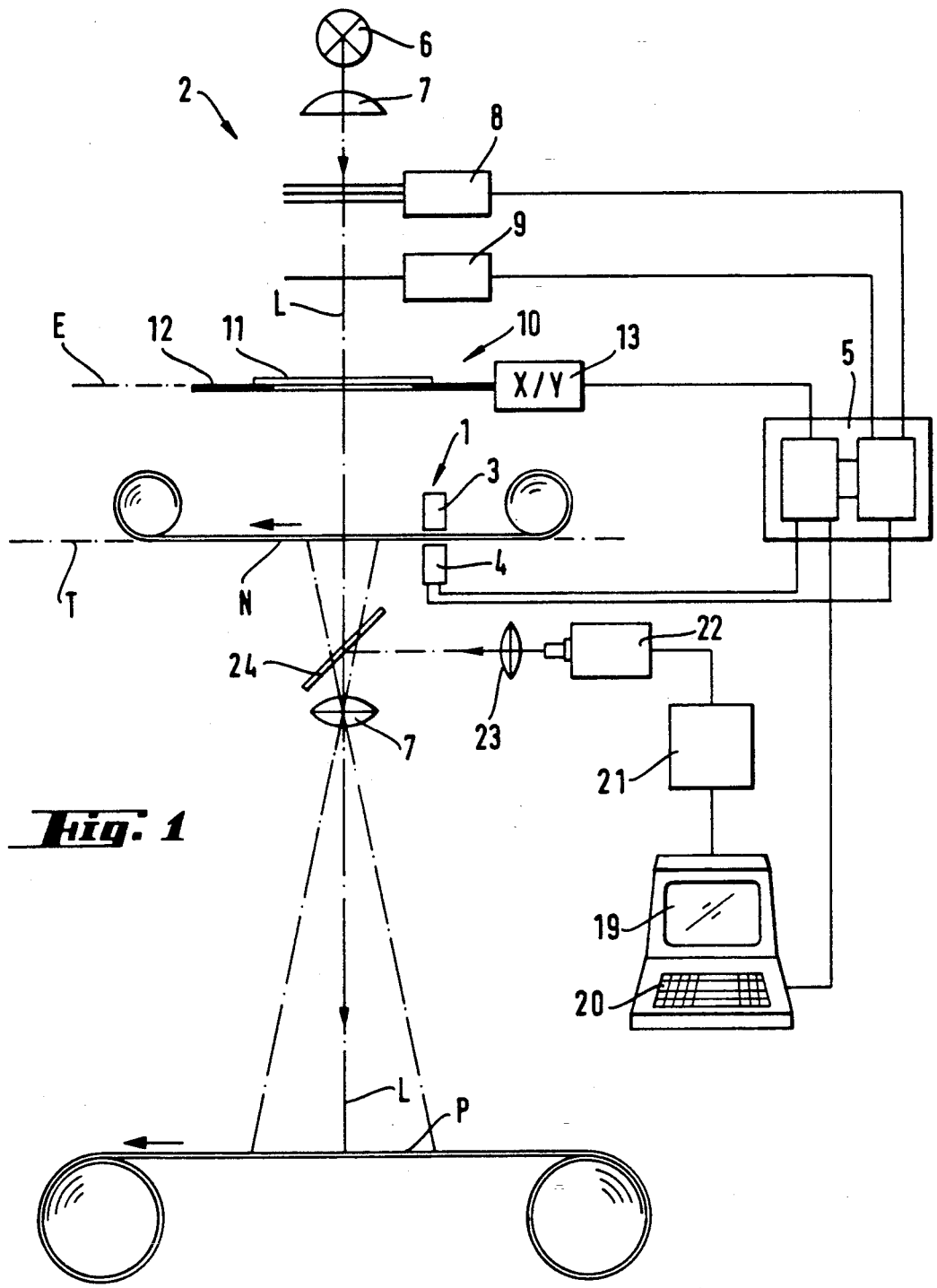
FIG. 1 shows a copy light beam path in a photographic copying apparatus according to an exemplary, preferred embodiment of the invention.

A photographic copying apparatus shown schematically in FIG. 1 includes a measuring station 1, an exposure station 2 and a computing and evaluating unit 5. The measuring station essentially contains a source 3 of measuring light and a detector layout 4. A copy master N transported in a transport plane T between a the light source 3 and the detector 4 is scanned by a beam of light from the light source 3 in intervals, or areas, preferably point by point. The measuring light transmitted by the copy master N impacts the detector layout 4. Nontransparent copy masters N may be analyzed by the detection of reflected measuring light. For this, however, the source 3 of the measuring light and the detector layout 4 are advantageously located on the information carrying side of the copy master N. The detector layout 4 includes a detector which converts the optical signals into electrical signals. The detector may be in the form of a mobile individual detector, a line detector or preferably a two-dimensional, matrix like CCD (Charge-Coupled-Device) detector. Particularly in the case of line detectors, and even more so with two-dimensional detectors, it is relatively simple to correlate the signals detected with the coordinates of the scanning spot of the copy master N in the transport plane T. The horizontal coordinates in the transport plane T in the transport direction are designated x and the vertical coordinates are designated y. The detector layout 4 is connected with the computing and evaluating unit 5 and transmits the detected and converted signals to the unit 5. The exposure station 2 includes a projection device with a source 6 of copy light, with preferably servo-controlled color filters 8, with a shutter 9 and projection optics 7, and an attenuating device 10, for the intermittent attenuation of the intensity of the copy light of the source of copying light.

In contrast to known devices, the attenuating device 10 of the photographic copy apparatus according to the invention includes a transparent mask 11 with ranges of different light permeabilities or densities. The mask 11 is located on a sliding device 12 and may be displaced in a plane of displacement E parallel to the transport plane T of the copy master N in the beam path L of the copying light of the copy light source 6. The mask 11 is preferably in the form of a gray mask with gray ranges having different light permeabilities. However, the mask 11 may also include regions of different densities of a color or of several different colors, in particular of the basic colors red, blue and green. As gray masks frequently exhibit color shadings in transitioning from a range of dense color to a color of lesser density, the mask 11 is preferably in the form of halftone graphics. Different gray graduations are preferably formed on the mask 11 using blackening dots. It is also possible to represent the different gray graduations of the mask by a varying number of blackening dots of equal size per unit surface. However, when using masks 11 of this type, care must be taken that the displacement plane E of the mask 11 is located outside the focusing range of the projection optics 7. Obviously, masks of a photographic material with locally different light permeabilities may also be used. The mask 11 is usually placed between the copy light source 6 and the copy master, but it could also be located after the copy master N as viewed in the beam path of the copy light.

Figure 2:
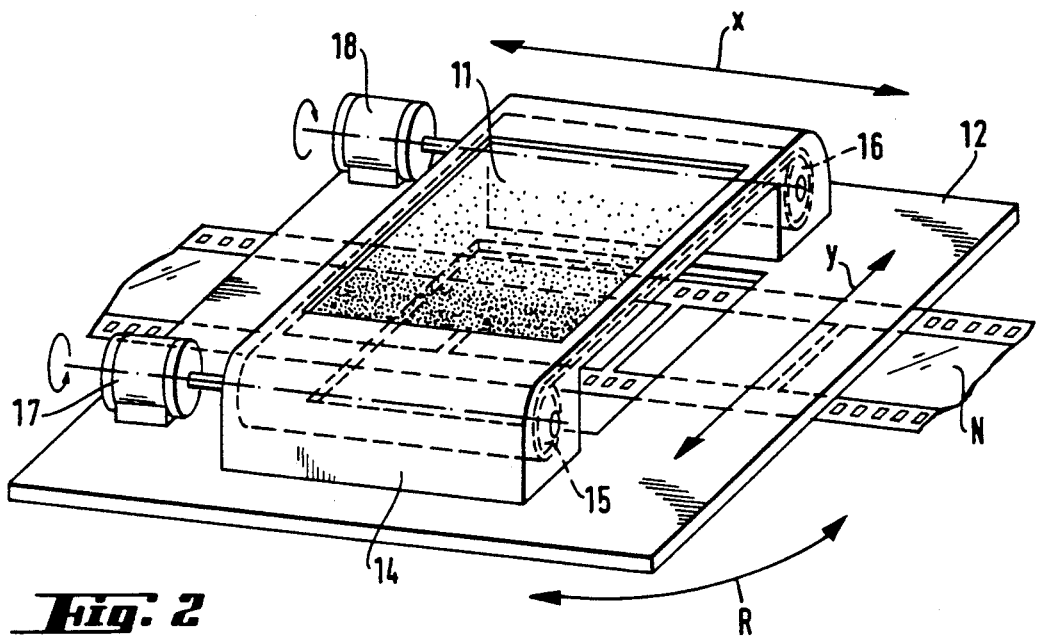
FIG. 2 shows an exemplary embodiment of a damping, or attenuating device identified by the symbol 10 in FIG. 1.

FIG. 2 shows an exemplary embodiment of an attenuating device 10 according to the invention. The mask 11 is in the form of a film that may be would and unwound to and from two motor driven rollers 15, 16. In the example shown, the film is housed in a cassette 14. The cassette 14 is located on a slide 12, with the two rollers releasably connected with two motors 17, 18 fastened to the slide 12. The slide 12 is in form of a frame. In this manner, the copying light may impact the copy master N in its entirety through a window of the cassette 14. The cassette 14 may be altogether replaced, together with the film housed in it, so that different types of masks 11 may be readily inserted. In FIG. 2, for the sake of clarity, the guide rails or the like for the slide 12 and the motors are omitted. The x-y control device 13 indicated in FIG. 1 is also not shown. A realization of the elements not shown and their electric and/or mechanical coupling with the devices indicated is in itself part of the known state of the art. To displace the mask 11, the slide 12 is moved by the x-y control device 13 parallel—double arrow x—and/or perpendicular—double arrow y—to the plane of displacement E. The prevailing second coordinate position y or x and the accurate positioning of the mask 11 is attained by winding the film from one roller 15, 16 to the other roller 16, 15 with the actuation of the motors 17 and 18. These two displacement processes may take place in succession to each other, but preferably they are carried out simultaneously under the control of the x-y control device. The arrow R in FIG. 2 further indicates that the slide 12 may be rotated preferably in the plane of displacement E. It is particularly advantageous to carry out this rotation continuously. In this manner, the masks containing a few ranges of different light permeabilities may be used in multiple applications and may be adapted to the prevailing requirements.

Figure 3:
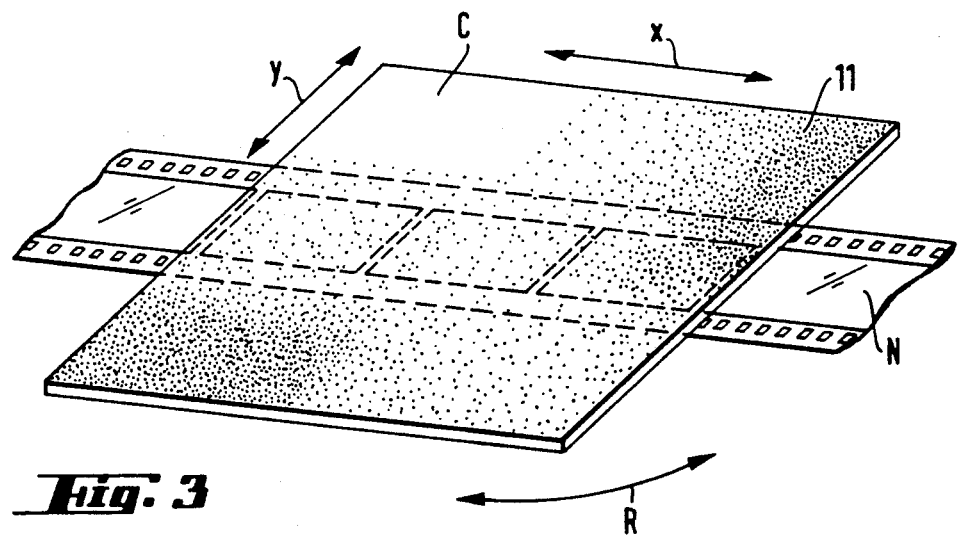
FIG. 3 shows a second exemplary mask.

In FIG. 3, a mask 11 in the form of a flat plate is shown. For the sake of clarity, the slide 12 and all other elements of the sliding device are omitted in FIG. 3. The double arrows x and y and the arrow R indicate the horizontal and vertical displacement of the mask 11 and its rotation in the plane of displacement E. It is seen clearly that the mask 11 has an area C that is free of halftone dots and has, as its minimum dimensions, those of the copy master N. This area C permits the essentially unimpeded passage of the copying light. The area is of particular advantage if the slide 12 together with the mask 11 located on it, is not always to be moved from a rest position outside the beam path L of the copying light of the light source 6 into said beam path. With a mask 11 in this form, a rest position may be chosen in which the mask 11 is located permanently in the beam path L in a manner such that the area C of the mask 11 and the copy master N coincide so that the copy light may pass through the area C essentially without hindrance and impact the entire copy master N without attenuations. This shortens the sliding paths and reduces the cost of the installation of the sliding device.

To prepare photographic copies P, the density of which is to be modified in intervals, the copy master N is scanned intermittently in the measuring station 1, preferably point by point. The measuring light transmitted or reflected by the copy master N is detected by the detection device 4 and converted into electronic measuring signals. The electrical measuring signals are passed on to the computing and evaluating unit 5 for further processing. First, density and color correction values are determined from the measuring signals, which correspond to the location dependent densities of the scanning ranges of the copy master N, in a known manner. Using the density and color correction values determined, the quantities of copy light required are determined, in particular the exposure times for the preparation of photographic copies P from the copy master N. Such a process for the determination of the necessary quantities of copy light and exposure times is described for example in EP-A-312499, the disclosure of which is hereby incorporated by reference in its entirety. Second, location dependent densities of the copy master N are also used for the determination of the overall contrast or contrast range of the copy master N. If the contrast range of the copy master N, which in the simplest case is determined as the difference between the maximum and minimum density value of the copy master N, exceeds a given limit value, the copy master is classified as including excessive contrasts and a regulating mechanism is actuated. Usually, this limit value of the contrast range of the copy master N is chosen as a density unit. The location dependent density values of the copy master N are stored immediately in a matrix form in the computing and evaluating unit 5. The line number of the density matrix represents the x coordinate, (i.e., the horizontal coordinate, in the transport plane T) and the column number represents the y coordinate, (i.e., the vertical coordinate in the transport plane T). The density matrix of the copy master N is compared with a location dependent density matrix of the currently used mask 11, which also is stored in the computing and evaluating unit 5. The density matrix of the mask 11 has the same local resolution as the density matrix of the copy master N, i.e., the distances of the individual space coordinates correspond to one another. The density matrix of the mask 11 is preferably at least four times larger than the density matrix of the copy master N. By comparing the density matrix of the copy master N with the density matrix of the mask 11, the range of the mask 11 is selected, the location dependent density variation of which is closest to the inverse location dependent density variation of the copy master N. The determination of this mask range is carried out using the known principle of the method of least-squares. Specifically, it is required that the expression $$\sum_{x=0}^{X} \sum_{y=0}^{Y} [K(x_0 + x, y_0 + y) - K(x_0, y_0) + a \cdot (N(x, y) - N)]^2 = \text{MIN}$$

represent a minimum. In this expression the individual values signify the following: x, y are the space coordinates of the density variation of the copy master N parallel and perpendicular to the direction of transport of the copy master N.

X and Y represent the number of scanning points of the copy master N parallel and perpendicular to the direction of transport. The four end points of the copy master are given by the coordinates (0,0), (0,Y), (X,0) and (X,Y).

$x_0$, $y_0$ signify the line and column numbers (space coordinates) of a corner element of a partial mask matrix resulting from the comparative superposition of the density matrices of the mask 11 and the copy master N.

$N(x,y)$ is the density variation of the copy master and N the average density of the copy master defined by $$N = \frac{1}{X \cdot Y} \sum_{x=0}^{X} \sum_{y=0}^{Y} N(x, y).$$

$K(x_0+x, y_0+y)$ describes the location dependent density variation of the selected partial area of the mask 11. The dimension of the partial mask matrix corresponds to the dimension of the density matrix of the copy master N. The expression $K(x_0, y_0)$ is defined by:

$$K(x_0, y_0) = \frac{1}{X \cdot Y} \sum_{x=0}^{X} \sum_{y=0}^{Y} K(x_0 + x, y_0 + y)$$

and describes the average density of the partial matrix area selected.

The terms:

$N(x,y) - N$ bzw. $K(x_0+x, y_0+y) - K(x_0, y_0)$ described the deviation of the density of the prevailing location of the copy master N and the partial area of the mask 11 from the average density of the copy master and the partial area of mask respectively.

The value of a in the first equation noted above is a scaling factor. This scaling factor a is usually chosen from a range of values larger than zero but smaller than one, so that the contrast range of a produced photographic copy P amounts to a maximum of two density units. In particular, the scaling factor a is intended to prevent intentional reversal during brightening introduced into the copy master (flash exposures).

Further, to effet a comparison of the two density matrices, the density matrix of the copy master N or the density matrix of the mask 11 may be rotated, in order to select an area satisfying the aforementioned criterion. These rotations are recorded and considered in the subsequent positioning of the mask. The spatial, or space coordinates of the selected partial area of the mask 11 are passed on the -y control device 13 of of the slide 12 for the mask 11. According to these control data, the mask 11 is then displaced in the beam path L of the copy light source 6 so that the partial area of the mask 11 selected is exposed in its entirety to the copying light of the copy light source 6.

This manner of density modification by areas may be observed in a simple fashion prior to the production of the photographic copy. For this, in the computing and evaluating unit 5, the measured densities of the copy master N, the density and color corrections determined and the location dependent density values of the partial area of the mask 11 selected are superimposed, inverted and converted into video signals. The signals formed in this manner are passed on to an image screen unit designated 19 in FIG. 1, on which a simulated image of the density corrected photographic copy P to be prepared, is produced.

The photographic copy apparatus shown in FIG. 1 also includes certain additional means to influence the image. Thus, the image screen unit 19 has an input keyboard 20 and is connected with graphic processor 21. In this manner, for example, tests may be produced by means of the keyboard 20, which then may be faded in with a projection lens 22, a projector 23 and a diverting mirror 24 into the beam path L, of the copying light and thus applied to the photographic copy P. In addition to this possibility of fading in texts, numerous other similar ways to influence the photographic copy are conceivable.

The exposure control process according to the invention makes it possible to correct the density of photographic copies P of copy masters N with excessive contrast in a simple manner. The simple density masks used, for example glass plates or films with different gray graduations, have low temperature sensitivities. The masks are not damaged in use and do not age prematurely. The problem of color casts in the transition from high density to lower density areas is eliminated by the use of halftone graphic masks. Most importantly, the masks are readily exchanged and the scanning grid is easily adapted to the copy master. The electric and electronic requirements and the additional mechanical means are not particularly involved, so that existing photographic copying machines may be retrofitted relatively simply and cost effectively. The results of local density modifications may be observed conveniently on a screen prior to the production of the copy. No additional expensive devices are required and further interfering beam splitter elements in the beam path of the copy light source are eliminated.

It will be appreciated by those of ordinary skill in the art that the present invention can be embodied in other specific forms without departing from the spirit or essential character thereof. The presently disclosed embodiments are therefore considered in all respects to be illustrative and not restrictive. The scope of the invention is indicated by the appended claims rather than the foregoing description and all changes which come within the meaning and range of equivalents thereof are intended to be embraced therein.

What is claimed is:

1. Process for exposure control of photographic copies comprising the steps of:
   scanning a copy master by areas in a measuring station with a measuring light beam;
   detecting measuring light transmitted or reflected by the copy master with a detection device;
   converting the detected measuring light into electrical measuring signals corresponding to densities of the scanning areas;
   evaluating the electrical measuring signals in a computing and evaluating unit to determine density and color correction values;
   determining quantities of copying light and exposure times based on said density and color correction values;
   controlling a source of copying light in an exposure station in response to said determined exposure times;
   attenuating the intensity of the copying light impacting the entire copy master by areas in accordance with predetermined criteria, said step of attenuating being performed with a mask having locally different light permeabilities and further including the steps of:
   correlating individual densities of the copy master with spatial coordinates of scanning areas in a transport plane of the copy master;
   intermediately storing said individual densities in said computing and evaluating unit;
   determining a density range of the copy master from the individual densities;
   comparing said density range with a predetermined limit value;
   comparing a location dependent density variation of the copy master with a location dependent density variation of the mask if said density range exceeds said predetermined limit value;
   selecting a partial area of the mask having a location dependent density variation closest to an inverse location dependent density variation of the copy master;
   passing spatial coordinates of said partial area density variation relative to the copying light beam path to an x-y control device of a mask displacing device; and
   displacing said mask such that the partial area is entirely exposed to the copying light.

2. Process according to claim 1, wherein said copy master is scanned point by point.

3. Process according to claim 1, wherein said individual densities of said copy master are stored as a matrix in said computing and evaluating unit, and said location dependent density variation vector is stored as a matrix equivalent relative to local resolution.

4. Process according to claim 1, further comprising a step of determining a similarity of the density variation in an area of the mask to the inverted location dependent density variation of the copy master using a least squares analysis such that $$\sum_{x=0}^{X} \sum_{y=0}^{Y} [K(x_0 + x, y_0 + y) - K(x_0, y_0) + a \cdot (N(x, y) - \overline{N})]^2 = \text{MIN}$$

represents a minimum, wherein x and y are the spatial coordinates of the location dependent density variation of the copy master parallel with and perpendicular to a direction of transport of the copy master;

X and Y signify a number of scanning points of the copy master parallel with and perpendicular to the direction of transport;

$x_0, y_0$ are line and column numbers representing spatial coordinates of a corner element of a partial mask matrix resulting from comparative superposition of density matrices of the mask and of the copy master;

$N(x,y)$ is the density variation of the copy master, $\overline{N}$ being an average density of the copy master, $K(x_0+x, y_0+y)$ represents the location dependent density variation of the partial area of the mask selected;

$K(x_0, y_0)$ represents an average density of the mask area selected; and a is a scaling factor.

5. Process according to claim 4, wherein the limit value of the contrast range of the copy master is chosen as a density unit.

6. Process according to claim 5, wherein the scaling factor a is chosen from within a range larger than zero and smaller than one, and a contrast range of a photographic copy produced amounts to a maximum of two density units.

7. Process according to claim 6, wherein the mask is displaced in a plane extending parallel to the transport plane of the copy master between the copying light source and the copy master.

8. Process according to claim 7, wherein the mask is displaced in a plane outside a focusing range of a projection optics in the exposure station.

9. Process according to claim 8, wherein said locally different light permeabilities are formed by halftone graphics in different gray stages, with blackening points of different sizes.

10. Process according to claim 9, wherein the mask is displaced from a rest position outside the beam path of the source of copying light into the beam path.

11. Process according to claim 9, wherein the mask is located during the analysis of the copy master under a source of copying light in a manner such that the copying light impacts a partial area of the mask, which passes the copying light through without hindrance.

12. Process according to claim 9, wherein said mask includes a flat plate and the partial area of the mask is positioned by displacing a motor driven slide parallel and perpendicularly to the direction of transport of the copy master.

13. Process according to claim 9, wherein the mask is in the form of a film wound onto two motor driven rollers mounted on a motor driven slide displaceable parallel and/or perpendicularly to the direction of transport of the copy master, said step of displacing further including the steps of moving the slide parallel and/or perpendicularly to the direction of transport into the copying light beam path to position the partial mask area, one of said directions of movement being established by winding the film from one roller onto the other.

14. Process according to claim 9, further comprising the steps of:
   superimposing, inverting and converting the individual densities of the copy master, the density and color corrections, and the location dependent density values of the partial mask area into video signals in the computing and evaluating unit; and,
   generating a simulated image of the density corrected photographic copy to be produced in an image screen unit.

15. Apparatus for the production of photographic copies of copy masters with a measuring station, comprising:
   a source of measuring light;
   a detector device for detecting said measuring light;
   a computing and evaluating unit for analyzing said detected measuring light; and
   an exposure station, said exposure station further comprising:
   a projection layout with a source of copying light, servocontrolled color filters, a shutter, projection optics and an attenuating device for attenuating the intensity of the copying light by areas, said attenuating device having a transparent mask with areas of different light permeabilities, said mask being mounted on a sliding device which is displaced in response to control signals generated in the computing and evaluating unit and transmitted to an x-y control unit of the slide, said sliding device being displaceable in two directions which are oriented perpendicular with respect to each other and in a plane parallel to the transport plane of the copy master, in a beam path of the copying light source.

16. Apparatus according to claim 15, wherein the mask comprises gray areas of different densities.

17. Apparatus according to claim 16 wherein said the plane of displacement is located outside a focusing range of the projection optics and between the source of copying light and the copy master.

18. Apparatus according to claim 17, wherein the mask is formed as a halftone graphic with blackening points of different sizes.

19. Apparatus according to claim 18, wherein the mask comprises at least one area at least as large as dimensions of the copy master, through which the copying light passes without hindrance.

20. Apparatus according to claim 19, wherein the mask is at least four times larger than an area of the copy master to be reproduced.

21. Apparatus according to claim 20, wherein the mask is a replaceable film that may be wound and unwound onto and from two motor driven rollers, said rollers being mounted together with the film on a slide displaceable by a motor in a horizontal and/or vertical direction.

22. Apparatus according to claim 21, wherein the film is housed in a cassette with said rollers, the rollers of the cassette being releasably connected with two motors mounted on the slide such that the cassette can be replaced as a unit.

23. Apparatus according to claim 19, wherein the mask is a flat plate and is mounted replaceably on a slide displaced by a motor in a horizontal and a vertical direction.

24. Apparatus according to claim 23, wherein the slide may be continuously rotated in its plane of displacement.

25. Apparatus according to claim 24, wherein the computing and evaluating unit is connected with an image screen unit to display the density corrected copy of the copy master simulated in the computing and evaluating unit.

* * * * *